United States Patent
Sjøgren et al.

(10) Patent No.: US 7,502,791 B2
(45) Date of Patent: Mar. 10, 2009

(54) DATABASE CONSTRAINT ENFORCER

(75) Inventors: Bjørn-Harald Sjøgren, Ski (NO); Jan-Thore Bjørnemyr, Hamar (NO)

(73) Assignee: Norsync Technology A/S, Oslo (NO)

( * ) Notice: Subject to any disclaimer, the term of this patent is extended or adjusted under 35 U.S.C. 154(b) by 204 days.

(21) Appl. No.: 10/720,262

(22) Filed: Nov. 25, 2003

(65) Prior Publication Data
US 2004/0107200 A1    Jun. 3, 2004

Related U.S. Application Data

(60) Provisional application No. 60/428,937, filed on Nov. 26, 2002.

(51) Int. Cl.
 *G06F 17/30* (2006.01)
(52) U.S. Cl. ................ 707/8; 707/2; 707/3; 707/9
(58) Field of Classification Search ............ 707/8, 707/9, 2, 3
See application file for complete search history.

(56) References Cited

U.S. PATENT DOCUMENTS

| | | | |
|---|---|---|---|
| 4,933,848 A * | 6/1990 | Haderle et al. | 707/201 |
| 4,947,320 A * | 8/1990 | Crus et al. | 707/201 |
| 5,386,557 A * | 1/1995 | Boykin et al. | 707/1 |
| 5,408,657 A * | 4/1995 | Bigelow et al. | 707/100 |
| 5,706,494 A * | 1/1998 | Cochrane et al. | 707/2 |
| 5,899,993 A * | 5/1999 | Jenkins, Jr. | 707/9 |
| 6,047,285 A * | 4/2000 | Jacobs et al. | 707/4 |
| 6,105,025 A * | 8/2000 | Jacobs et al. | 707/8 |
| 6,453,314 B1 * | 9/2002 | Chan et al. | 707/3 |
| 7,272,589 B1 * | 9/2007 | Guay et al. | 707/2 |
| 2003/0140028 A1 | 7/2003 | Sjøgren | |

FOREIGN PATENT DOCUMENTS

EP    0351210    1/1990

OTHER PUBLICATIONS

"Referential Integrity Impementation Details and advantages" IBM, Technical Disclosure Bulletin, IBM Corp New York, Mar. 1, 1995, pp. 477-487.
Date C.J. "referential Integrity" Conference on Very Large Databases, Cannes, Sep. 9-11, 1981 IEEE US vol CONF 7 pp. 2-12 XP00745022.
EP search report, listing above, dated Sep. 6, 2004.

\* cited by examiner

*Primary Examiner*—Tim T Vo
*Assistant Examiner*—Mahesh H Dwivedi
(74) *Attorney, Agent, or Firm*—Birch, Stewart, Kolasch & Birch, LLP

(57) ABSTRACT

A transaction based constraint enforcer for a database system is arranged to delay constraint checks until the end of a transaction by creating a check stack during the course of the transaction and executing entries on the check stack at the end of the transaction. A stack maker module is arranged for creating and updating said check stack. The stack maker module is operatively connected to a runtime module in the database system and arranged to receive data from said runtime module. An enforcer module is arranged to receive check data from the check stack, to process the check data received from the check stack, and to provide resulting data to the runtime module. The invention also relates to a method for enforcing a set of constraints that governs the integrity of information stored in a database system, and a database system which includes the constraint enforcer.

12 Claims, 4 Drawing Sheets

DATABASE CONSTRAINT ENFORCER

RELATED APPLICATION DATA

This application claims priority to U.S. Provisional Application No. 60/428,937, filed Nov. 26, 2002, entitled "Constraint Enforcer", which is expressly incorporated herein by reference in its entirety.

FIELD OF THE INVENTION

This invention relates generally to database technology.

More specifically, the invention relates to a transaction based constraint enforcer for a database system, a method for enforcing constraints that governs the integrity of information stored in a database system, and a database system which includes a transaction based constraint enforcer.

BACKGROUND OF THE INVENTION

Consistency is one of the primary design goals of database systems. Consistency means that the information stored in the database obeys certain constraints defined for the database.

A DML statement is a modification, such as a deletion, an insertion or an update (or modification), of a single piece of information in a database.

A transaction is a sequence of DML statements that performs a single logical action in a database application.

The 100% principle states: There is one grammar which completely and exclusively prescribes all the permitted information base states and all the permitted information base transitions. This grammar is called the Conceptual Schema.

One requirement that is deducted from the 100% principle is that all updates storing, deleting or modifying information has to be interrupted and checked by a constraint enforcer.

Constraints are a special case of the term "conceptual rules". Conceptual rules are the rules that prescribe all permitted states and transitions a database can undertake. Conceptual Rules are not limited to testing the legality of data, but also includes computational capabilities. Conceptual Rules should always be obeyed, and they should be "fired" as a result of any database change.

There are two types of Conceptual Rules, rules of static nature and of dynamic nature. Static rules can be checked at any time, while dynamic rules must be checked for each update. E.g. a unique Social Security Number (SSN) for a person can be checked at any time, but a status change from Married to Divorced can only be checked when the status is changed. The present invention mainly relates to constraint enforcers for static rules.

To keep a database consistent at all times, sometimes needs very complex programming.

Some constraints are impossible to implement if they have to be checked per DML statement. One example is the equal constraint. An equal constraint is a rule that says that for a given value in Table T1, the same value must exist in Table T2, and vise versa. If you insert T1 first, the value does not exist in T2 and the insert is rejected. If you insert T2 first, the value does not exist in T1 and the insert is rejected. It is a deadlock situation.

For these kinds of problems, the term Conceptual Transaction has been introduced. It states that at the beginning and end of the transaction, the database must be in a consistent state. During the transaction the database is allowed to be in an inconsistent state. By using a Conceptual Transaction, the above examples become quite trivial.

A Database Transaction is a sequence of DML statements needed for a program to do a certain task. It may be thought of as an envelope with DML statements.

If during the course of a transaction, the Conceptual Rules may be broken, the transaction is referred to as a Conceptual Transaction.

It has been previously observed that it would be sufficient to check all involved Constraints in a Conceptual Transaction for the total database at the end of the transaction. But it was also understood that such an approach would be too time consuming for a practical implementation.

An objective of the present invention is to provide a transaction based constraint enforcer for a database system, a method for enforcing a set of constraints that governs the integrity of information stored in a database, and a database system, which provides a full constraint check facility, satisfying the 100% principle for databases.

Another object of the invention is to provide such a constraint enforcer, a method, and a database system which may be implemented in a simple and efficient way.

A particular object of the invention is to provide such a transaction based constraint enforcer, a method, and a database system, wherein the number of tests that need to be performed at the end of a series of DML statements included in a conceptual transaction does not exceed the number of tests that would have to be performed if the DML statements were not bracketed in a conceptual transaction.

Another particular object of the invention is to provide such a constraint enforcer, a method, and a database system, which includes a transaction based constraint enforcer, wherein conceptual transaction may be implemented in a fashion that allows single DML statements s as well as a transaction comprising a sequence of DML statements.

SUMMARY OF THE INVENTION

In accordance with a first aspect of the present invention, a transaction based constraint enforcer for enforcing a set of constraints that governs the integrity of information stored in a database system is provided. The enforcer is arranged to delay constraint checks until the end of a transaction by creating a check stack during the course of the transaction and executing entries on the check stack at the end of the transaction.

Advantageously, the constraint enforcer comprises a stack maker module, arranged for creating and updating the check stack. The stack maker module is also operatively connected to a runtime module in the database system and arranged to receive data from the runtime module.

The constraint enforcer advantageously further comprises an enforcer module, arranged to receive check data from the check stack, to process the check data received from the check stack, and to provide resulting data to the runtime module.

Advantageously, the constraints are stored in a conceptual rules module included in the constraint enforcer, comprising rules for prescribing permitted states and transitions that the database can undertake. The stack maker module is operatively connected to the conceptual rules module and arranged to retrieve constraints from the conceptual rules module.

The check stack may be stored on persistent or volatile memory.

The constraint enforcer is advantageously further arranged to handle a modify operator as a delete operator followed by an insert operator.

In accordance with a second aspect of the present invention, a method for enforcing a set of constraints that governs the integrity of information stored in a database system is provided. The method comprises the steps of enforcing a set of constraints that governs the integrity of information stored in the database, and delaying constraint checks until the end of a transaction by creating a check stack during the course of the transaction and executing entries on the check stack at the end of the transaction.

Advantageously, the method further comprises the following steps, performed by a stack maker module operatively connected to a runtime module in the database system: receiving data from the runtime module, retrieving constraints from the conceptual rules module, and creating and updating the check stack.

Advantageously, the method further comprises the following steps, performed by an enforcer module: receiving check data from the check stack, processing the check data received from the check stack, and providing resulting data to the runtime module.

Advantageously, the constraints are stored in a conceptual rules module, comprising rules for prescribing permitted states and transitions that the database can undertake. The stack maker module is operatively connected to the conceptual rules module and arranged to retrieve constraints from the conceptual rules module.

The check stack used in the method may be stored on persistent or volatile memory.

The method advantageously further comprises the step of handling, by the stack maker module, a modify operator as a delete operator followed by an insert operator.

According to a third aspect of the present invention, a database system is provided. The database system comprises an application program interface, providing a two-way message interface to a user application program, a runtime module, operatively connected to the application program interface, a storage engine module, operatively connected to the runtime module, a data storage, operatively connected to the storage engine module, and a transaction based constraint enforcer as described above. The constraint enforcer is thus arranged for enforcing a set of constraints that governs the integrity of information stored in the database, said enforcer being arranged to delay constraint checks until the end of a transaction by creating a check stack during the course of the transaction and executing entries on the check stack at the end of the transaction.

Additional features and principles of the present invention will be set forth in part in the description which follows, and in part will be obvious from the description, or may be learned by practice of the invention. The features and principles of the present invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention, and, together with the description, explain the features and aspects of the invention. In the drawings.

DETAILED DESCRIPTION OF THE EMBODIMENTS

Reference will now be made in detail to the present invention, examples of which are illustrated in the accompanying drawings.

Figure 1:
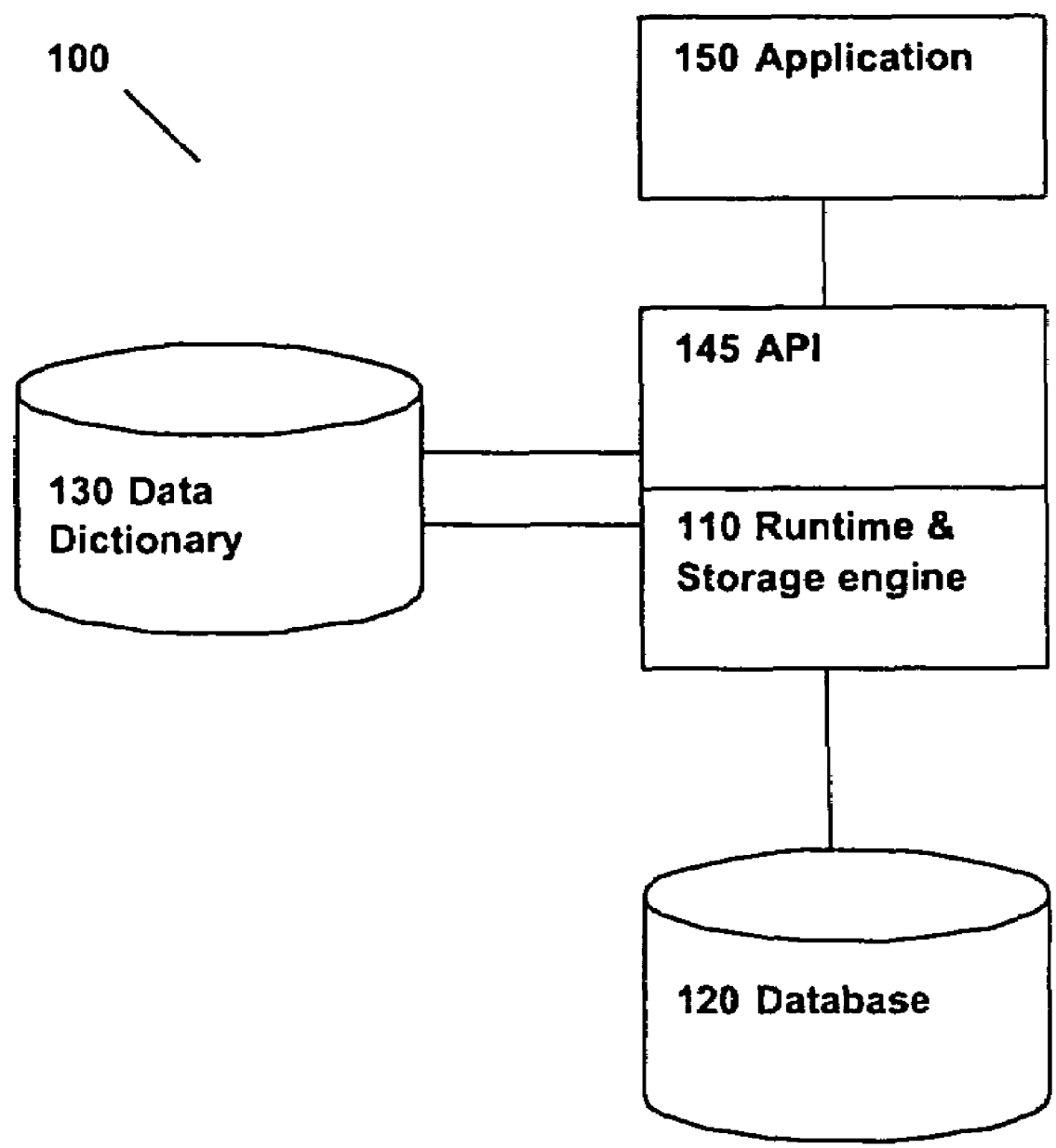
FIG. 1 is an exemplary block diagram of a conventional database system environment, applicable for use with the principles of the present invention

FIG. 1 is an exemplary block diagram of a conventional database system environment, applicable for use with the principles of the present invention.

The database system 100 as shown in operates in an interpreter like execution mode. The system 100 includes an interpreting database runtime module and storage engine 110, a data storage 120, an online data dictionary 130, an application program interface 145 and an application program 150.

The interpreting database runtime module and storage engine 110 functions as the actual data interpreter. The data storage 120 physically stores the data, i.e., data files.

The online data dictionary 130 stores meta-data, typically including information describing tables, columns, fields, data types for columns, and domain restrictions for these columns. The meta-data kept in the data dictionary 130 also includes information about different constraints, such as primary keys, foreign keys, subset constraints, exclude constraints, etc. The meta-data are typically provided by a data model or schema (not shown), compiled by a schema compiler (not shown).

Figure 2:
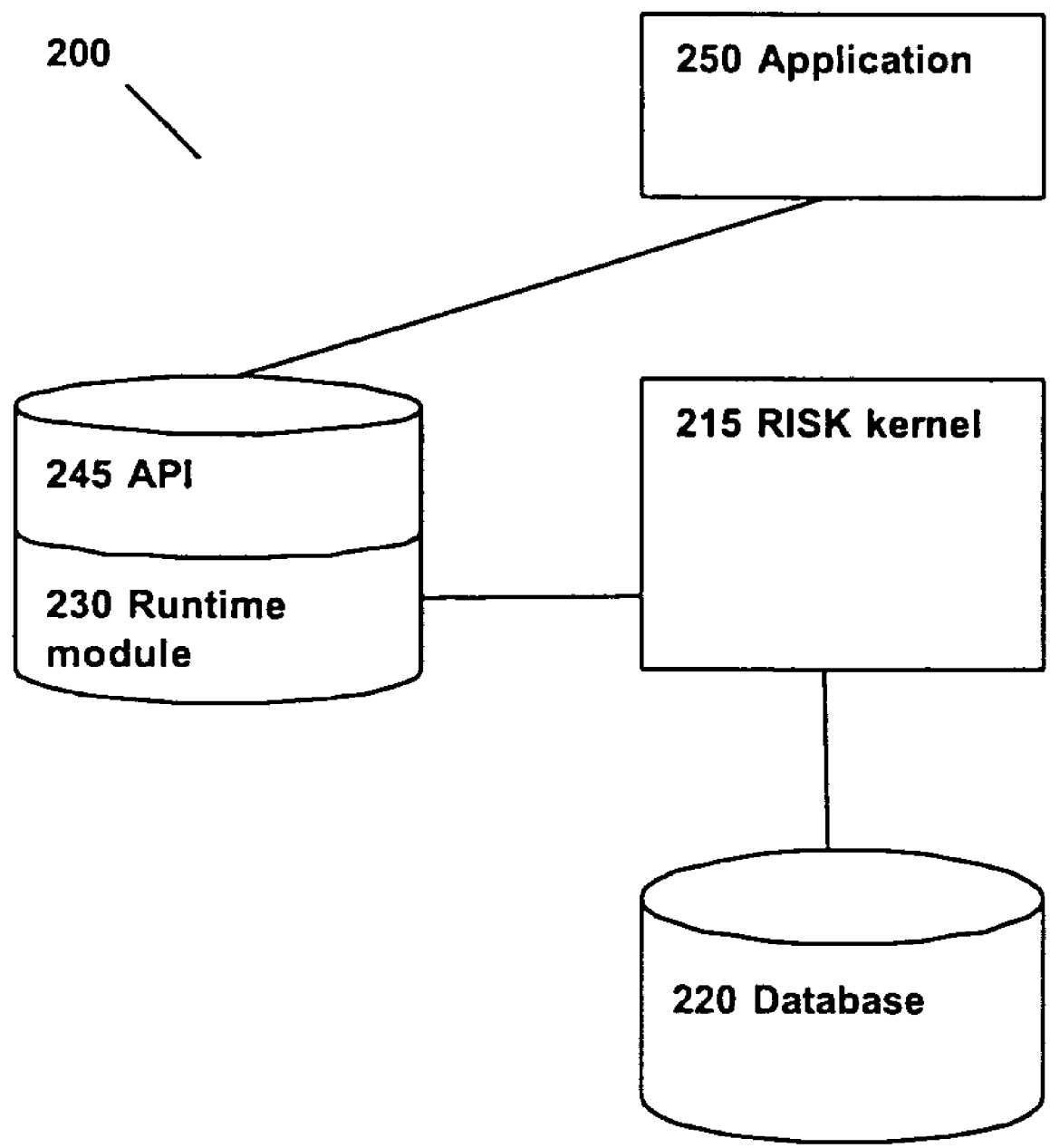
FIG. 2 is an exemplary block diagram illustrating a database system environment with a dynamically changeable runtime module, applicable for use with the principles of the present invention.

FIG. 2 is an exemplary block diagram illustrating a database system environment with a dynamically changeable runtime module, also applicable for use with the principles of the present invention.

The system illustrated in FIG. 2 includes a database runtime module 230. The database runtime module 230 is an executable program, which is generated from a code generator (not shown), which in turn operates according to a data model or schema represented in an offline data dictionary (not shown). The offline data dictionary essentially keeps the same information as would be kept in the online data dictionary 130 shown in FIG. 1. The offline data dictionary thus includes meta data including information about constraints.

The database runtime module 230 is operatively connected to a storage engine denoted a RISK module (Reduced Instruction Set Kernel) 215. The RISK module 215 is operatively connected to the data storage 220, which physically stores the data, i.e., data files.

The database runtime module 230 also includes an application program interface (API), which is operatively connected to an application program 250.

The generated runtime module 230 includes constraint checking functionality. Thus, the runtime module is tailor-made for the constraints kept in the offline dictionary and used by the code generator.

In the following description, the term "eDB" is used for a database system in accordance with the dynamically changeable runtime module approach illustrated in FIG. 2.

Figure 3:
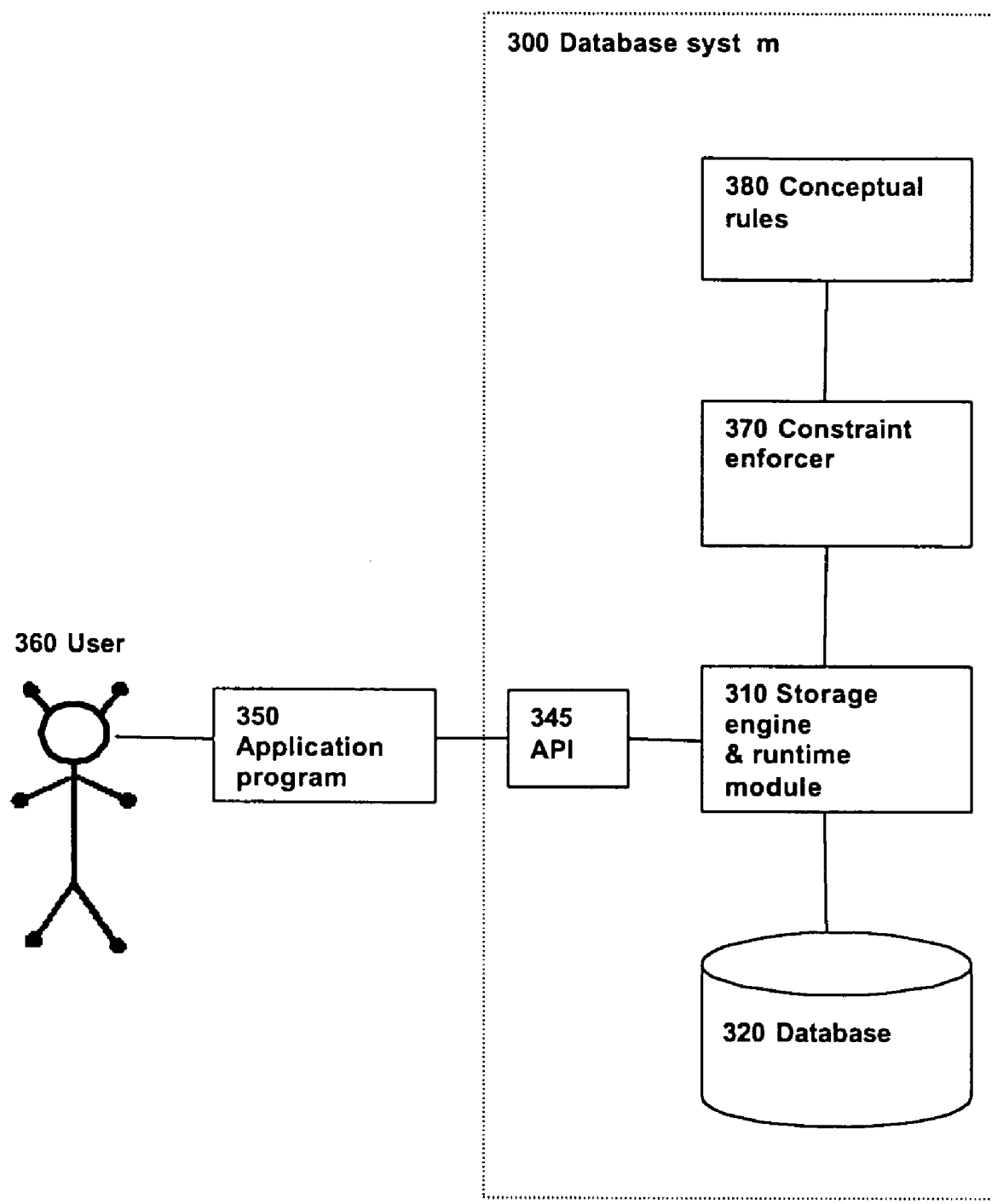
FIG. 3 is an exemplary block diagram illustrating a database system which includes a constraint enforcer.

FIG. 3 is an exemplary block diagram illustrating a database system which includes a constraint enforcer.

An application program 350, operated by a user 360, is operatively connected to the database system 300 via an application program interface (API) 345. The API 345 is operatively connected to a runtime and storage engine module 310. This is, in turn, further operatively connected to the database 320, which is the data storage for physical storage of the data, i.e., data files.

The user 360 is thus allowed to communicate messages to the database system 300. DML statements derived from such messages from the environment, in particular from the user 360, are checked by the constraint enforcer 370 before they are accepted in the database system 300. The constraint enforcer 370 is operatively connected to a conceptual rule unit 380 on the one side, and to the runtime and storage engine 319 on the other side. The purpose of the constraint enforcer is to assure the 100% principle is satisfied for the database system 300 as a whole.

Figure 4:
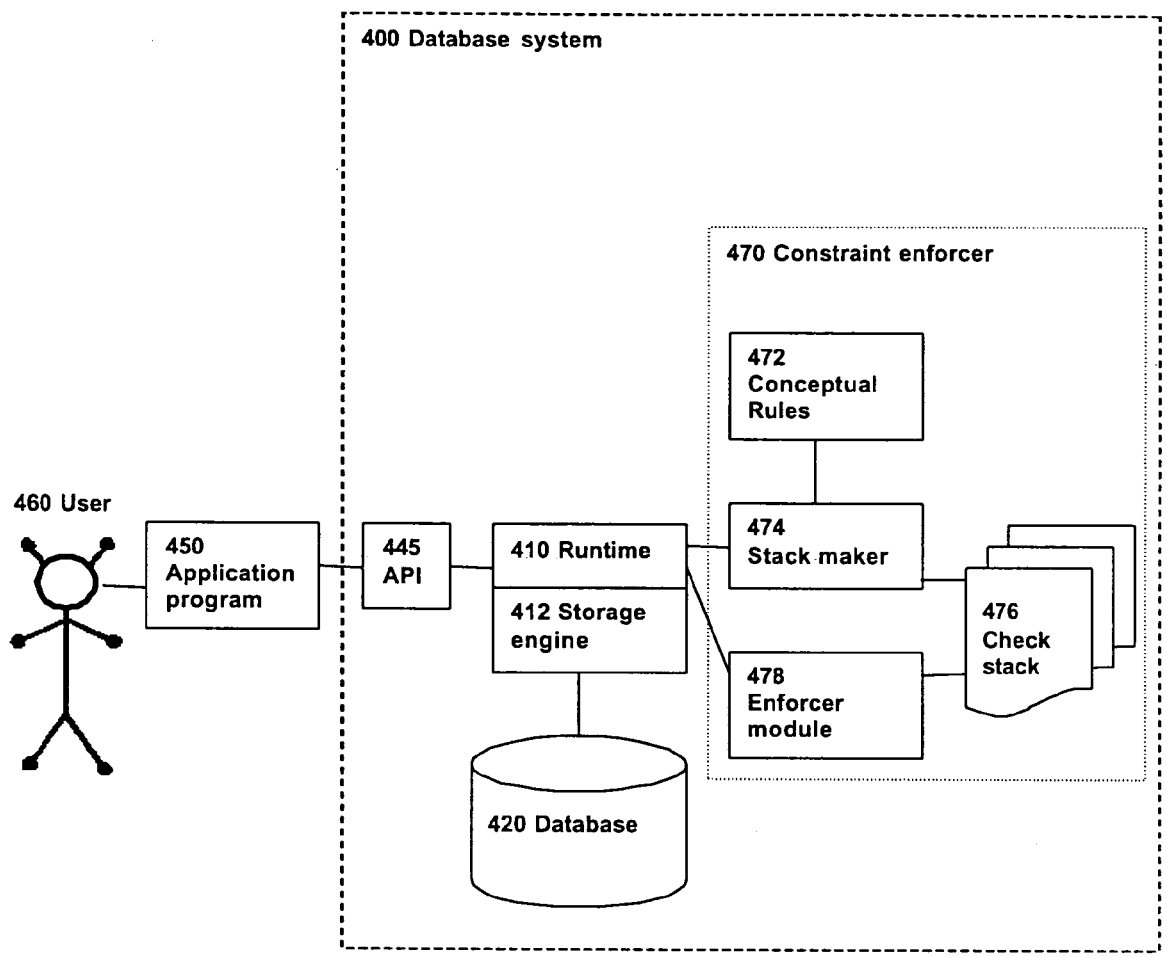
FIG. 4 is an exemplary block diagram illustrating a database system which includes a constraint enforcer, consistent with the principles of the present invention.

FIG. 4 is an exemplary block diagram illustrating a database system which includes a constraint enforcer, consistent with the principles of the present invention.

An application program 450, operated by a user 460, is operatively connected to the database system 400 via an application program interface (API) 445. The API 445 is operatively connected to a runtime module 410 in close operative connection with a storage engine module 412. The storage engine module 412 is further operatively connected to the database 420, which is the data storage for physical storage of the data, i.e., data files.

The user 460 is thus allowed to communicate messages to the database system 400. SML statements derived from such messages from the environment, in particular from the user 460, are checked by the constraint enforcer 470 before they are accepted in the database system 400. The constraint enforcer 470 is operatively connected to the runtime module 410. The purpose of the constraint enforcer 470 is to assure the 100% principle is satisfied for the database system 400 as a whole.

The constraint enforcer 470 comprises a stack maker module 474, a conceptual rules module 472, an enforcer module 478 and a check stack 476.

If the constraint enforcer, the method or the system according to the invention is operating in an environment of the traditional type as illustrated in FIG. 1, the conceptual rules module 472 should be understood to be a subset of the rule set incorporated in the data dictionary 130. On the other hand, if the constraint enforcer, the method or the system according to the invention is operating in a dictionary-free environment which includes a dynamically changeable runtime module, as illustrated in FIG. 2, the conceptual rules module 472 should be understood to be an executable program module, corresponding to a set of rules, as described in the offline dictionary.

The stack maker module 474 is operatively connected to the runtime module 410 and arranged to receive data form the runtime module 410. The stack maker module 474 is further arranged to populate and maintain the check stack 476. The stack maker module 474 is further operatively connected to the conceptual rules module 472, which in this case is an integrated part of the constraint enforcer 470. The check stack is operatively connected to the enforcer module 478, which in turn is operatively connected to the runtime module 410. The enforcer module 478 is arranged to process the check stack and thus perform the checks.

In the following, the invention will be described in further detail, primarily in conjunction with the "eDB" environment as described with reference to FIG. 2. The skilled person will however realize that the principles of the invention are also applicable for the conventional environment as described with reference to FIG. 1.

As an approach in order to arrive at the present invention, one would think that it should be possible to stack information gathered during the course of the transaction. That stacked information could then be used at the end of the transaction to verify the consistency from the stacked information and the database.

A first approach is to stack Constraints and Table references in order to check all referential and uniqueness Constraints at the end of the transaction. This proves insufficient. It is trivial to find examples where the proposal is insufficient. Three cases that demonstrate the problem are given below.

TABLE A

Stack of Constraints and record occurrences that have to be checked.

| Constraint | Table | Table address |
|---|---|---|
| Equal-1 | T1 | alt1 |
| Equal-1 | T2 | alt2 |
| Subset-1 | T3 | alt3 |

Observe that the kind of DML statement (Insert, Update or Delete) is missing but may be added. As appears, there are still problems.

Delete is a special problem since you have no Table address to use, and therefore no previous value to check against.

Observe that if T3 is the Subset "owner", then all Subset-1 members pointing to T3 (alt3) must be checked at the end of the transaction. The check has sometimes to be done against previous value(s) that does not exist at the end of the transaction.

A variant where references to the class occurrences involved in the rule, is put on a list, should be sufficient for inserts. However Delete and Update may "hide" what should be checked (previous values).

Such a modified approach is therefore also insufficient.

The Check Stack

Although the check stack is not a real stack, it is called so as its originator as an idea was the constraint stack.

The new stack is a list of all checks that has to be performed at the end of the transaction.

The Check Stack contains a list of simple functions that have to be performed at the end of a Conceptual Transaction to check the consistency.

TABLE B

Stack of Check-functions, check-arguments and proper messages.

| Message | Table to check | Value to check | The check |
|---|---|---|---|
| Duplicate of T1 | T1 | t1 Value | LessThan2 |
| Equal value missing in T2 | T2 | t1 Value | OneOrMore |
| Duplicate of T2 | T2 | t2 Value | LessThan2 |
| Equal value missing in T1 | T1 | t2 Value | OneOrMore |
| T3 value is used in Tmember | Tmember | OriginalT3Value | OneOrMOwn |

The first four entries are from two Inserts and the last one is from a Delete.

The Nature of Constraints and Transactions

A constraint check is performed via certain operations (the check) and operands (columns). According to the invention, we have proposed to stack the operations and operands to be performed (together with necessary diagnostic information for proper diagnostic to the application).

A Transaction may contain more than a single DML statement. There is no guarantee that any given database occurrence is used with only one DML statement. That means that a modified occurrence may then be modified or deleted later in the transaction. A deleted occurrence may be inserted again later end even modified after that.

In modification, supporting keys may change, so an earlier established operand in the stack has to be changed. The following examples should demonstrate the above statement:

TABLE C

Transaction Table 1.

| Transaction | The check and operands. |
| --- | --- |
| Insert (r) | There should be Insert entries with "r" values in the stack. |
| Insert (r), Delete (r) | There should be no entries for "r" in the stack. |
| Insert (r), Modify (r to r1) | There should be Insert entries with "r1" values |
| Insert (r), Modify (r to r1), Delete (r1) | There should be no entries for "r" or "r1" in the stack. |
| Delete (r) | There should be Delete entries with "r" values |
| Modify (r to r1) | There should be Modify entries with "r to r1" values in the stack. |
| Modify (r to r1), Modify (r1 to r2) | There should be Modify entries with "r to r2" values in the stack. |
| Modify (r to r1), Delete (r1) | There should be Delete entries with "r" values |

If one observe that a Modify (r to r1) is equivalent with Delete (r), Insert (r1), the table will look like (cf. Table D):

TABLE D

Transaction Table 2.

| Transaction | The check and operands. |
| --- | --- |
| Insert (r) | There should be Insert entries with "r" values in the stack. |
| Insert (r), Delete (r) | There should be no entries for "r" in the stack. |
| Insert (r), Delete (r), Insert (r1) | There should be Insert entries with "r1" values |
| Insert (r), Delete (r), Insert (r1), Delete r1) | There should be no entries for "r" or "r1" in the stack. |
| Delete (r) | There should be Delete entries with "r" values |
| Delete (r), Insert (r1), | There should be Modify entries with "r to r1" values in the stack. |
| Delete (r), Insert (r1), Delete (r1), Insert (r2) | There should be Modify entries with "r to r2" values in the stack. |
| Delete (r), Insert (r2), Delete (r2) | There should be Delete entries with "r" values |

The pair Insert (n), Delete (n) demonstrates that we need not to put entries in the Check Stack for such pairs according to Table 1. Therefore we can ignore Stack entries from the DMLs marked gray in Table 2.

The inventive method must therefore advantageously delete stack entries from an Insert(n) when a DML Delete(n) occurs as the next DML.

In order to detect an Insert—Delete sequence on a stack with entries related to many different Table types, and different Table occurrences, we have to identify both.

Therefore the stack need a Table+Rowid entry and the DML originator.

In order to distinguish stack entries belonging to different parallel transactions we also have to add a transaction identifier. Since nested transactions upon one database, from the same process, are forbidden, the transaction identifier may be the ID of the process issuing the transaction. We will call it PID.

The modified stack will formally look like (cf. Table E):

TABLE E

| | | | | Modified stack | | | |
| --- | --- | --- | --- | --- | --- | --- | --- |
| PID | Table | Rowid | Origin | Column(s) to check | Value to check | The check | Message |
| 1 | T1 | 1 | INSERT | T1, C1, C2, ... | t1Value | LessThan2 | Duplicate of T1 |
| 1 | T1 | 1 | INSERT | T2, C1, C2, ... | t1Value | OneOrMore | Equal value missing in T2 |
| 1 | T2 | 2 | INSERT | T2, C1, C2, ... | t2Value | LessThan2 | Duplicate of T2 |
| 1 | T2 | 2 | INSERT | T1, C1, C2, ... | t2Value | OneOrMore | Equal value missing in T1 |
| 1 | T3 | 1 | DELETE | Tmember, C1, C2, ... | Original t3Value | OneOrMOwn | T3 value is used in Tmember |

In order to find previous entries that should be removed (Insert—Delete), it is practically to be able to find the entries to be removed, by using Column values that should match as a key in the Stack.

If a Delete (T1) was issued after the stack has been established as shown above, all Insert (T1) entries should be removed.

This is equivalent to all entries with PID=1, Table=T1, Rowid=1 and Origin="INSERT".

Therefore PID, Table, Rowid and Origin is selected as key, from now on called the DML-key.

Implementation of the Check Stack

Stack handling considerations.

Note that in order to delete an Insert entry in the Check Stack—Delete from the stack they will from the eDB point of view use the DML-key.

In eDB the Check Stack will be implemented as entries in an Index Structure.

All entries belonging to a single DML is found by (cf. Table F)

TABLE F code for finding all entries belonging to a single DML

DML_key.PID = value;
DML_key.Table = value;
DML_key.Rowid = value;
DML_key.Origin = "DML":
status = eDB_OBT("Constraint_Stack", "DML_key");

An equivalent SQL is trivial for other databases.

Check considerations.

The above arguments mostly concern handling of the stack during the Conceptual Transaction lifetime.

Now we will look at needs from the "Check" point of view.

We have so far seen the check functions: LessThan2, OneOrMore and OneOrMOwn.

LessThan2:

There should at most exist 1 value set (v1, v2, ...) for the Column combination (c1, c2, ...). This can easily be checked if an supporting index for (c1, c2, ...) are established in the eDB database. Therefore all Uniqueness Constraints will be supported by an index Structure.

IneOrMore:

There must at least exist 1 value set (v1, v2, ...) for the Column combination (c1, c2, ...). This can easily be checked if an supporting index for (c1, c2, ...) are established in the eDB database. Therefore all Subset Constraints will be supported by an index Structure for the Subset "owner".

OneOrMOwn:

For the previous value set (v1, v2, ...) for the Column combination (c1, c2, ...) in the "owner", find any "member" with current value set (v1, v2, ...) for the Column combination (c1, c2, ...). If any—are there still at least one "owner" that satisfy the value set. Therefore all Subset Constraints will be supported by an index Structure for the Subset "member".

In general, all set oriented Constraints will be supported by indices or constructs called projections.

Column in the Check Stack, and the OneOrMOwn demonstrates the need for both the "owner" and the "member" index. Projections can replace owner indices in the described algorithm. Projections are a key-tuple with a counter added.

The Stack Column "Columns to Check" can be one ore more columns from one single Table.

However, the supporting index implicitly "declares" the columns.

Shown later, some tests have to be executed by more than one function. And the next function may be dependent upon the previous function. By including a serial number called Testno, functions that constitute a test can be identified by having equal Testno.

Furthermore, since functions in a multifunction test may be dependent they have to be ordered by a Seqno, which is included as well.

The expanded DML-key is: PID, Table(this), Rowid, Origin, Testno and Seqno.

All entries belonging to a single DML is then found by a sub key of the DML-key (Major key processing)

Last, the function dependency as in the multifunction test checks Column(s). For that purpose, a Test Column called Ccol is added.

In the eDB database, a message is issued via a diagnose number. We will therefore replace Message with Diag.

As a result of the above arguments, the stack needs to hold (cf. Table G):

TABLE G

| The stack | | | | | | | | | | |
|---|---|---|---|---|---|---|---|---|---|---|
| PID | Table (This) | Rowid | Origin | Testno | Seqno | Index (This) | Value (to check) | Index (Opposite) | Function (The check) | Ccol | Diag |

Rules to Populate the Stack

The table below explains which operation and operands to stack. For Update, only occurrences where the supporting key has changed will be considered. All others will be ignored since they cannot cause a constraint violation.

Constraint Reference Table (cf. Table H).

TABLE H

| Constraint reference table | | | | | | |
|---|---|---|---|---|---|---|
| DML | | Unique | Subset | Equal | Exclude (a | Include/ (b Total |
| Insert | Condition | All | Current = Member | All | All | |

TABLE H-continued

Constraint reference table

| DML | | Unique | Subset | Equal | Exclude (a | Include/ (b Total |
|---|---|---|---|---|---|---|
| | Function Operand | LessThanTwo, Current supporting key | OneOrMore Owner (Corecord) supporting key | OneOrMore Corecord supporting key | Zero Corecord supporting key | |
| Delete | Condition | All | 1) Current = Member 2) Current = Owner | | All | |
| | Function | None | 1) None 2) Zero Occ for all Members | | None | |
| | Operand | | 1) None 2) Owner supporting key | | | |

Explanations to Table H:
  Mutual is allowed
  Is equivalent to a sequence of Subset (OR-ed.)
  Entries with exist pointers to Current are removed from the list. New similar pointers may occur later as a result of a new insert.

Test Functions:
  Zero Zero Occurrence
  The Index should have a count=0.
  OneOrMore At least one Occurrences
  The Index should have a count>=1.
  LessThanTwoLess 2 Occurrences
  The Index should have a count<2.
  OneOrMOwn One ore more Owners
  For all_MEMBERS (if any) that still exist with Index Value, there must be at least one
  _OWNER that exist with the same value.
  IfNotNull A condition for other tests
  True if Ccol≠NULL These functions have proven to support all Constraints currently supported by eDB. However, the algorithm does not limit the implementation to these. New functions can be added if expansions of the constraint repertoire should occur.

Rules to Maintain the Stack

The life of every record (r) starts with an INSERT and ends with a DELETE. In between there may be zero to n numbers of MODIFY. Therefore consider the transaction three transactions:

Trans1={Insert (r), Modify (r to r1), Modify (r1 to r2)}
Trans2={Modify (r to r1), Modify (r1 to r2)}
Trans3={Modify (r to r1), Delete (r1)}

With the proposed breakdown of Modify, we will observe the following stack transaction calls:
For Trans1
eDB_INS(r , , ,
  1) onINS(r , , ,
eDB_UPD(r1 , , ,
  2) onDEL(r , , ,
  3) onINS(r1 , , ,
eDB_UPD(r2 , , ,
  4) onDEL(r1 , , ,
  5) onINS(r2 , , , Note that a Delete(r) nullifies the effect of a previous Insert(r). Therefore any onDEL(r , , , must look for an previous onINS(r , , , .
How is that safely done?
The Check Stack looks like (cf table I):

TABLE I

The Check Stack

| PID | Table (This) | Rowid | Origin | Testno | Seqno | Index (This) | Value (to check) | Index (Opposite) | Function (The check) | Ccol | Diag |
|---|---|---|---|---|---|---|---|---|---|---|---|

It is stored like an index structure with DML-key (PID, Table, Rowid, Origin, Testno, Seqno).
All stack entries from the Insert(r) will have:
PID=Unique Process No
Table=The insert Table
Rowid=The main structure Rowid returned from the eDB Kernel.
Origin="INSERT"
The answer to the above question is the code shown below (cf. Table J).

TABLE J code

DML_key.PID = Unique Process No;
DML_key.Table = The insert Table;
DML_key.Rowid = Rowid from the eDB Kernel;

TABLE J-continued

```
code

DML_key.Origin = "INSERT";
status = eDB_OBT("Constraint_Stack", "DML_key");
while (status = = NoErr) {
    status = eDB_DEL("Constraint_Stack");
    status = eDB_OBT("Constraint Stack", "DML_key");
}
``` onINS(r , , , will not do any maintenance of the stack, it will just insert entries according to rules to populate the stack.

onDEL(r , , , will Delete stack entries where Origin=INS and Table=Table and Rowid=Rowid.

The Store in the Check Stack Call

The following call is used to store information on the Check Stack:

```
/** ------------------------------ FUNCTION ------------------------------*
| StoreDefered:                                                            |
*--------------------------------------------------------------------------*
| Store defered on Defered three                                           |
| RecordTypeName:     Table being updated                                  |
| Rowid:              Rowid being updated                                  |
| Origin:             The update function INSERT/DELET                     |
| ConstraintRecord:   The table being checked                              |
| IndexName:          Supporting index                                     |
| Itree:              Basis for the "computed" Value                       |
| Function:           The check function                                   |
| Diag:               Diag no of message if failure                        |
|                                                                          |
*--------------------------------------------------------------------------**/
```

StoreDefered (RecordTypeName, Rowid, Origin, Testno, ConstraintRecord, IndexName, Itree, Function, Diag, CoIndex, CheckElement)

| Table (This) | Rowid | Origin | Table to check | Supporting Index | Index Value | Function (The check) | Diag no |
|---|---|---|---|---|---|---|---|
| String31 | long | unsigned char | String31 | String31 | unsigned char | unsigned char | long |

And its internal structure should look like:

```
/* For Defered_check data definition
typedef struct {
    long        Rownum;
    Boolean     Virtual;
    unsigned char NullIndicator                 [13];
        unsigned char Process_No_Is_owner_of    [11];
        unsigned char RT_Name_Id_of             [31];
        unsigned char RowID_Id_of               [11];
        unsigned char Origin_name_of            [6];
        unsigned char Testno_For_test_of        [11];
        unsigned char Sequence_Within_testno    [11];
        unsigned char RT_Name_Is_checked_by     [31];
        unsigned char Indx_Name_Used_by         [31];
        unsigned char Value_Checked_by          [33];
        unsigned char Function_name_Used_by     [10];
        unsigned char Diag_no_For_error_of      [11];
        unsigned char Element_name_Checked_in   [31];
        unsigned char Indx_Name_Is_co_for       [31];
```

```
    short       CurrUniversal;
    short       CurrProcessType;
    Boolean     Exhausted;
    long        BC_Logstatus;
    long        ParselStart;
} ZB_ZDefered;
```

FIG. 4 illustrates a system according to the invention, resulting from the above discussion.

The Constraint Enforcer 470 comprises two essential parts: The stack maker module 474 is arranged to populate and maintain the Check Stack, and the enforcer module 478 is arranged to process the Check Stack and perform the checks.

Further advantageous features of the invention are described in the following:

The stack maker module 474 is arranged to perform a particular insert method on the check stack when the stack maker module 474 is called upon as a result of a DML insert or a DML update.

The above mentioned insert method involves placing all checks that must be performed as a result of the table type being inserted and the conceptual rules found for the table type with proper check information to efficiently perform the checks at a later stage.

The stack maker module 474 is further arranged to perform a particular delete method on the check stack when the stack maker module 474 is called upon as a result of a DML delete or a DML update.

The above mentioned delete method involves the first step of deleting all previous INSERT checks found on the stack for the Table occurrence being deleted in current transaction. The delete method further involves the subsequent step of placing all checks that must be performed as a result of the Table type being deleted and the Conceptual Rules found for the Table type with proper check information to efficiently perform the checks at a later stage.

The stack maker module 474 is further arranged to perform the above delete method followed by the above insert method on the check stack when the stack maker module 474 is called upon as a result of a DML update.

The enforcer module 478 is arranged for processing the check stack when called upon as a result of an end transaction or a single DML statement outside a transaction. The enforcer module 478 is further arranged for processing checks according to the check information found in each individual entry on the check stack. The enforcer module 478 is further arranged for informing the caller with a message retrieved from the check stack entry about possible detected integrity violations when processing the check stack. The enforcer module 478 is further arranged for deleting the whole stack at the end.

In operation, the system according to the invention, illustrated in FIG. 4, fulfils the 100% principle.

Its mechanism has a handling capability beyond the constraint assortment that have become industry standard today.

The present invention provides for the true implementation of Conceptual Transaction and allows the end user to manipulate the database without being concerned about temporary inconsistencies.

Modifications and adaptations of the present invention will be apparent to those skilled in the art from consideration of the specification and practice of the invention disclosed herein. The foregoing description of an implementation of the invention has been presented for purposes of illustration and description. It is not exhaustive and does not limit the invention to the precise form disclosed.

Modifications and variations are possible in light of the above teachings or may be acquired from the practicing of the invention.

The invention claimed is:

1. A transaction based constraint enforcer for a database system, for enforcing a set of constraints that governs the integrity of information stored in the database system, said enforcer being arranged to delay constraint checks until the end of a transaction by creating a check stack during the course of the transaction and executing entries on the check stack at the end of the transaction, the constraint enforcer comprising
    a stack maker module, arranged for creating and updating said check stack, said stack maker module being operatively connected to a runtime module in the database system and arranged to receive data from said runtime module,
        wherein the check stack contains a list of functions that have to be executed at the end of the transaction, said functions originating from Insert, Delete and Update Data Manipulation Language (DML) operations calling up the stack maker module,
            the Insert DML operation calling up the stack maker module leading to an insert process being performed on the check stack,
                the insert process involving placing all checks that have to be executed as a result of an occurrence of a table type being inserted and corresponding conceptual rules being identified for the table type being inserted,
            the Delete DML operation calling up the stack maker module leading to a delete process being performed on the check stack,
                the delete process involving removing previously inserted entries on the check stack for the occurrence to be deleted and placing all checks that have to be executed as a result of a table type being deleted and corresponding conceptual rules being identified for the table type being deleted, and
            the Update DML operation calling up the stack maker module leading to said delete process followed by said insert process being performed on the check stack,
    an enforcer module, arranged to receive check data from the check stack, to process the check data received from the check stack, and to provide resulting data to the runtime module,
    a conceptual rules module wherein said constraints are stored in the form of rules for prescribing permitted states and transitions that the database can undertake, the conceptual rules module being operatively connected to said stack maker module,
    said stack maker module being arranged to retrieve constraints from said conceptual rules module,
        wherein said constraints are constraints executed within the transaction which allow conceptual rules to be broken during the transaction, but allow the database system to be in a consistent state at the beginning and end of the transaction.

2. Constraint enforcer according to claim 1, wherein said check stack is stored on persistent or volatile memory.

3. Constraint enforcer according to claim 1, wherein said constraints are selected from: primary keys, foreign keys, subset constraints, and exclude constraints.

4. Method for enforcing a set of constraints that governs the integrity of information stored in a database system, the constraints being stored in a conceptual rules module in the form of rules for prescribing permitted states and transitions that the database can undertake, the method comprising the steps of
    delaying constraint checks until the end of a transaction by creating a check stack during the course of the transaction and executing entries on the check stack at the end of the transaction,
    by a stack maker module operatively connected to a runtime module in said database system: receiving data from said runtime module, and
    creating and updating said check stack, and retrieving constraints from said conceptual rules module,
        wherein the check stack contains a list of functions that have to be executed at the end of the transaction, said functions originating from Insert, Delete and Update Data Manipulation Language (DML) operations calling up the stack maker module,
            the Insert DML operation calling up the stack maker module leading to an insert process being performed on the check stack,
                the insert process involving placing all checks that have to be executed as a result of an occurrence of a table type being inserted and corresponding conceptual rules being identified for the table type being inserted,
            the Delete DML operation calling up the stack maker module leading to a delete process being performed on the check stack,
                the delete process involving removing previously inserted entries on the check stack for the occurrence to be deleted and placing all checks that have to be executed as a result of a table type being deleted and corresponding conceptual rules being identified for the table type being deleted, and
            the Update DML operation calling up the stack maker module leading to said delete process followed by said insert process being performed on the check stack, and
    by an enforcer module: receiving check data from the check stack, processing the check data received from the check stack, and providing resulting data to the runtime module,
        wherein said constraints are constraints executed within the transaction which allow conceptual rules to be broken during the transaction, but allow the database system to be in a consistent state at the beginning and end of the transaction.

5. Method according to claim 4, wherein said check stack is stored on persistent or volatile memory.

6. Method according to claim 4, wherein said constraints are selected from: primary keys, foreign keys, subset constraints, and exclude constraints.

7. A database system, comprising an application program interface, providing a two-way message interface to a user application program, a runtime module, operatively connected to the application program interface, a storage engine module, operatively connected to the runtime module, a data storage, operatively connected to the storage engine module, and a transaction based constraint enforcer, for enforcing a set of constraints that governs the integrity of information stored in the database system, said enforcer being arranged to delay constraint checks until the end of a transaction by creating a check stack during the course of the transaction and executing entries on the check stack at the end of the transaction, said constraint enforcer further comprising a stack maker module, arranged for creating and updating said check stack, said stack maker module being operatively connected to a runtime module in the database system and arranged to receive data from said runtime module, wherein the check stack contains a list of functions that have to be executed at the end of the transaction, said functions originating from Insert, Delete and Update Data Manipulation Language (DML) operations calling up the stack maker module, the Insert DML operation calling up the stack maker module leading to an insert process being performed on the check stack, the insert process involving placing all checks that have to be executed as a result of an occurrence of a table type being inserted and corresponding conceptual rules being identified for the table type being inserted, the Delete DML operation calling up the stack maker module leading to a delete process being performed on the check stack, the delete process involving removing previously inserted entries on the check stack for the occurrence to be deleted and placing all checks that have to be executed as a result of a table type being deleted and corresponding conceptual rules being identified for the table type being deleted, and the Update DML operation calling up the stack maker module leading to said delete process followed by said insert process being performed on the check stack, an enforcer module, arranged to receive check data from the check stack, to process the check data received from the check stack, and to provide resulting data to the runtime module, a conceptual rules module wherein said constraints are stored in the form of rules for prescribing permitted states and transitions that the database can undertake, the conceptual rules module being operatively connected to said stack maker module, said stack maker module being arranged to retrieve constraints from said conceptual rules module, wherein said constraints are constraints executed within the transaction which allow conceptual rules to be broken during the transaction, but allow the database system to be in a consistent state at the beginning and end of the transaction.

8. System according to claim 7, wherein said check stack is stored on persistent or volatile memory.

9. System according to claim 7, wherein said constraints are selected from: primary keys, foreign keys, subset constraints, and exclude constraints.

10. Constraint enforcer according to claim 1, wherein the enforcer module is further arranged to inform a caller with a message retrieved from the check stack entries associated with detected integrity violations.

11. Method according to claim 4, further comprising the step of informing a caller with a message retrieved from the check stack entries associated with detected integrity violations.

12. System according to claim 7, wherein the enforcer module is further arranged to inform a caller with a message retrieved from the check stack entries associated with detected integrity violations.

* * * * *